United States Patent [19]

Wiley et al.

[11] Patent Number: 5,018,977

[45] Date of Patent: May 28, 1991

[54] MOTORCYCLE ACCIDENT SIMULATING TEST DUMMY

[75] Inventors: Kenneth D. Wiley, Torrance; John W. Zellner, Rancho Palos Verdes, both of Calif.; Andre St. Laurent; James A. Newman, both of Gloucester, Canada; Thomas J. Szabo, Nepean, Canada; Nicholas Shewchenko, Hull, Canada

[73] Assignee: Dynamic Research, Inc., Torrance, Calif.

[21] Appl. No.: 341,729

[22] Filed: Apr. 21, 1989

[51] Int. Cl.⁵ .............................................. G09B 23/28
[52] U.S. Cl. .................................... 434/274; 434/262; 434/267; 128/740
[58] Field of Search ....................... 434/274, 262, 267; 128/740, 68, 80 R; 623/18, 16, 22, 39; 73/866.4

[56] References Cited

U.S. PATENT DOCUMENTS

| | | | |
|---|---|---|---|
| 3,557,471 | 1/1971 | Payne et al. | 434/274 |
| 3,648,389 | 3/1972 | Melzian | 434/267 |
| 3,664,038 | 5/1972 | Searle et al. | 434/274 |
| 3,707,782 | 1/1973 | Alderson | 434/267 |
| 3,722,103 | 3/1973 | Gregoire | 73/866.4 |
| 3,740,871 | 6/1973 | Berton et al. | 434/267 |
| 3,753,301 | 8/1973 | Daniel et al. | 434/267 |
| 3,753,302 | 8/1973 | Daniel | 434/274 |
| 3,754,338 | 8/1973 | Culver | 434/274 |
| 3,755,920 | 9/1973 | Smrcka | 434/274 |
| 3,757,431 | 9/1973 | Daniel | 434/274 |
| 3,762,069 | 10/1973 | Culver | 434/274 |
| 3,762,070 | 10/1973 | Culver | 434/274 |
| 3,841,163 | 10/1974 | Daniel | 73/866.4 |
| 3,877,156 | 4/1975 | Itoh | 434/267 |
| 3,890,723 | 6/1975 | Haurat et al. | 434/267 |
| 3,962,801 | 6/1976 | Gonzalez | 434/274 |
| 4,000,564 | 1/1977 | Haffner et al. | 434/274 |
| 4,161,874 | 7/1979 | Specker et al. | 73/866.4 |
| 4,235,025 | 11/1980 | Kortge | 434/274 |
| 4,261,113 | 4/1981 | Alderson | 434/274 |
| 4,276,032 | 6/1981 | Woley et al. | 434/274 |
| 4,349,339 | 9/1982 | Daniel | 434/274 |
| 4,395,235 | 7/1983 | Becker | 434/270 |
| 4,409,835 | 10/1983 | Daniel et al. | 434/274 X |
| 4,488,433 | 12/1984 | Denton et al. | 434/274 X |
| 4,691,556 | 9/1987 | Mellander et al. | 73/866.4 |
| 4,701,132 | 10/1987 | Groesch et al. | 434/274 |
| 4,708,836 | 11/1987 | Gain et al. | 434/274 |
| 4,850,877 | 7/1989 | Mason et al. | 434/274 |
| 4,873,867 | 10/1989 | McPherson et al. | 434/274 X |

OTHER PUBLICATIONS

Nyquist and Denton, "Crash Test Dummy Lower Leg Instrumentation for Axial Force and Bending Moment", ISA Transactions, vol. 18, No. 3, pp. 13–15, 1979.
Enhanced Anatomically Representative Manikan Pelvis Supporting a Self-Contained Instrumentation/Electronics Subsystem, Frisch et al., Dec. 1989.
A New High-Fidelity Human Analog for Ejection Testing, White et al, Dec. 1984.
SSMIR-A New Approach to Acqusition of Data During an Aircraft Seat/Sled Ejection Sequence, White et al., Dec. 1984.
Limb Restraint Evaluation (LRE), Thomas Gustin, May 1985.
Adam—The Physical Being, Richard White, Jr., Nov. 1987.
The Adam Data Acquisition System, Joseph Kowalski, Dec. 1986.
The Development of a Dynamic Human Analog, Richard White, Jr., May 1987.

*Primary Examiner*—V. Millin
*Assistant Examiner*—Jennifer L. Doyle

[57] ABSTRACT

A motorcycle accident simulating test dummy and method utilizing the test dummy wherein the test dummy includes motorcycle handle bar grips operable to releasably connect the dummy and motorcycle handle bar, frangible limb/joint structure, and a wholly self contained and test dummy protected, accident condition data acquisition unit.

20 Claims, 5 Drawing Sheets

SECTION A-A

SECTION B-B

MOTORCYCLE ACCIDENT SIMULATING TEST DUMMY

BACKGROUND OF THE INVENTION

This invention pertains to motorcycle accident testing and simulation. In particular, it relates to the utilization of an accident simulating, test dummy to simulate, in an effective and realistic mode, injuries which might be sustained during motorcycle accidents.

1. Field of the Invention

The field of the invention pertains to anthropomorphic devices and anthropodynamic techniques utilized to simulate motorcycle accident situations and results.

2. Description of the Related Art

In an "over-view" sense, the development of accident simulating test dummies is evidenced at least in substantial part by disclosures in the United States patent literature as shown by the following issued U.S. Patents:

| Patentee | U.S. Pat. No. | Assignee | Issue |
|---|---|---|---|
| Payne, et al | 3,557,471 | Wyle Lab | 1971 |
| Melzian | 3,648,389 | Sierra Engineering Co. | 1972 |
| Searle, et al | 3,664,038 | Motor Industry Research Association | 1972 |
| Alderson | 3,707,782 | Alderson Research Laboratories, Inc. | 1973 |
| Gregoire | 3,722,103 | The United States of America as represented by the Secretary of the Navy | 1973 |
| Berton, et al | 3,740,871 | Ford Motor Company | 1973 |
| Daniel, et al | 3,753,301 | Ford Motor Company | 1973 |
| Daniel | 3,753,302 | Ford Motor Company | 1973 |
| Culver | 3,754,338 | General Motors Corporation | 1973 |
| Smrcka | 3,755,920 | Alderson Research Laboratories, Inc. | 1973 |
| Daniel | 3,757,431 | Ford Motor Company | 1973 |
| Culver | 3,762,069 | General Motors Corporation | 1973 |
| Culver | 3,762,070 | General Motors Corporation | 1973 |
| Daniel | 3,841,163 | Ford Motor Company | 1974 |
| Itoh | 3,877,156 | Unassigned | 1975 |
| Haurat, et al | 3,890,723 | Automobiles Peugeot, et al | 1975 |
| Gonzalez | 3,962,801 | Societe Anonyme Automobiles Citroen | 1976 |
| Haffner, et al | 4,000,564 | The United States of America as represented by the Secretary of the Department of Transportation | 1977 |
| Specker, et al | 4,161,874 | The United States of America as represented by the Secretary of the Department of the Air Force | 1979 |
| Kortge | 4,235,025 | General Motors Corporation | 1980 |
| Alderson | 4,261,113 | Humanetics, Inc. | 1981 |
| Woley, et al | 4,276,032 | Unassigned | 1981 |
| Daniel | 4,349,339 | Ford Motor Company | 1982 |
| Becker | 4,395,235 | The United States of America as represented by the Secretary of the Navy | 1983 |
| Daniel, et al | 4,409,835 | Ford Motor Company | 1983 |
| Denton, et al | 4,488,433 | Robert A. Denton, Inc. | 1984 |
| Mellander, et al | 4,691,556 | AB Volvo | 1987 |
| Groesch, et al | 4,701,132 | Daimler-Benz Aktiengesellschaft | 1987 |
| Gain, et al | 4,708,836 | Commissariat a l'Energie Atomique, et al | 1987 |

Of the patents included in this compilation, Payne, et al and Gregoire, Specker, et al, Becker, Mellander, et al and Gain, et al specifically relate to anthropomorphic devices utilizing head evaluation units, with the Gain, et al patent being directed to motorcycle accident simulation.

Payne, et al, Smrcka, Haffner, et al, Kortge, Alderson, Woley, et al, Daniel, and Denton, et al are of particular interest in so far as they relate to joint and/or simulated knee mechanisms included in anthropomorphic devices.

Payne, et al, Gregoire, Smrcka, Alderson, Daniel, and Denton, et al are of particular interest in relation to anthropomorphoic units comprising limb means.

Payne, et al, Melzian, Searle, et al, Gregoire, Daniel, et al and Groesch, et al are relevant with respect to thorax and/or torso structures in anthropomorphic devices.

It is also to be recognized that developments in this art are also evidenced in the literature and in issued foreign patents as evidenced, for example by the citations appearing on the face of the various U.S. Patents noted above.

SUMMARY OF THE INVENTION

The present invention is designed to provide improvements with respect to the art as heretofore developed. Specifically, it is contemplated that the invention will be characterized by a unique degree of biofidelity by involving 1) accuracy with respect to stress/strain measuring and realistic motion freedom, 2) direct indications of potential injuries, especially to limbs and joints; and 3) self-containment of data acquisition means wholly within a test dummy so as to avoid the error inducing restraints imposed by external data transmitting means such an umbilical cords, etc.

Specifically, in one aspect, the invention resides in a basic apparatus combination characterized by a motorcycle accident simulating test dummy including body means, limb means including at least one of arm means, and leg means; hand means; and joint means providing articulated connecting means between at least a portion of the limb means and at least one of another portion of the limb means or body means. The unique test dummy in this context of the invention includes:

motorcycle handle bar gripping means
 included in the hand means, and
  operable to releasably connect the dummy and motorcycle handle bar means;
 the motorcycle handle bar gripping means being operable to release the dummy from the motorcycle handle bar means after gripping force, imposed by the motorcycle handle bar gripping means on the handle bar means is overcome by the inertial forces imposed on the dummy during accident simulation;

sensor means operable to sense an accident simulating condition imposed on the limb means,
 the sensor means being operable to generate data signal means in response to the sensing by the sensor means;

data receiving and storage means operable to receive the data signal means from the sensor means and store such data within the body means;

housing and shock protecting means housing the data receiving means so that it is wholly contained within the body means, with this housing and shock protecting means being operable to shield the data receiving means from forces imposed on the dummy during accident simulation; and signal transmitting means operable to transmit the data signal means from the sensor means to the data receiving and storage means,
 the signal transmitting means being contained entirely within the dummy and being free of externally extending transmitting means physically attached to any means apart from the dummy; and the limb means including frangible, fracture-simulating means operable to fracture in response to inertial stress on-external forces imposed on the dummy during accident simulation, this frangible, fracture simulating means including visual indicating means operable to provide a visual simulation of limb fracturing, and means operable to permit relative movement between fractured limb means segments, thereby simulating relative freedom of movement of fractured limbs during simulated accidents.

A second, independently significant aspect of the invention resides in a combination having:

motorcycle handle bar gripping means
included in the hand means of the test dummy, and
operable to releasably connect the dummy and the motorcycle handle bar means;

the motorcycle handle bar gripping means being operable to release the dummy from the motorcycle handle bar means after gripping force, imposed by the motorcycle handle bar gripping means on the handle bar means is overcome by the inertial forces imposed on the dummy during accident simulation;

first sensor means operable to sense at least one of stress and/or strain imposed on the limb means of the dummy, the first sensor means being operable to generate first data signal means in response to the sensing by the first sensor means;

second sensor means operable to sense at least one of stress and/or strain imposed on the joint means,
the second sensor means being operable to generate second data signal means in response to the sensing by the second sensor means;

data receiving and storage means operable to receive the data signal means from at least one of the first and second sensor means and store this data within the thorax means;

housing and shock protecting means housing the data receiving means so that it is wholly contained within the thorax means, with the thorax means being operable to shield the data receiving means from forces imposed on the dummy during accident simulation; and signal transmitting means operable to transmit at least one of the first and second data signal means from the first and second sensor means to the data receiving and storage means,
the signal transmitting means being contained entirely within the dummy and being free of externally extending transmitting means physically attached to any means apart from the dummy.

A still additional, independently significant aspect of the invention resides in a combination including:

motorcycle handle bar gripping means
included in the hand means of the test dummy, and
operable to releasably connect the dummy and motorcycle handle bar means;

the motorcycle handle bar gripping means being operable to release the dummy from the motorcycle handle bar means after gripping force, imposed by the motorcycle handle bar gripping means on the handle bar means is overcome by the inertial forces imposed on the dummy during accident simulation;

first sensor means operable to sense at least one of stress and/or strain imposed on the limb means,
the first sensor means being operable to generate first data signal means in response to the sensing by the first sensor means;

second sensor means operable to sense at least one of stress and/or strain imposed on the joint means,
the second sensor means being operable to generate second data signal means in response to the sensing by the second sensor means; and the limb means including frangible, fracture simulating means operable to fracture in response to inertial stress or external forces imposed on the dummy during accident simulation, with this frangible, fracture simulating means including visual indicating means operable to provide a visual simulation of limb fracturing, and means operable to permit relative movement between fractured limb means segments simulating relative freedom of movement of fractured limbs during simulated accidents.

Further independently significant aspects of the invention reside in 1) unique, multi-directional simulated limb means reinforcing, 2) articulated knee joint structures providing progressively intensified resistance to deflection in both upright torsional and lateral tilting modes of a knee joint and permitting ultimate failure or collapse, and 3) in ligament simulating aspects of a dislocatable hip joint.

Further independent significance is attached to a unique, upright array of data modules disposed on opposite sides of the terminus portion of data signal transmitting means, thereby uniquely shielding and protecting the signal transmitting terminus and providing a uniquely compact structure, wholly contained within a thorax portion of the test dummy.

Further independently significant aspects of the invention reside in method counterparts of each of the apparatus aspects of the invention noted above.

BRIEF DESCRIPTION OF THE DRAWING

In describing the invention, reference will be made to certain presently preferred embodiments as illustrated in drawings appended hereto.

In making reference to such drawings and preferred embodiments, such will be done by way of example and not by way of limitation with respect to the scope of the invention.

In The Drawings

Figure 1:
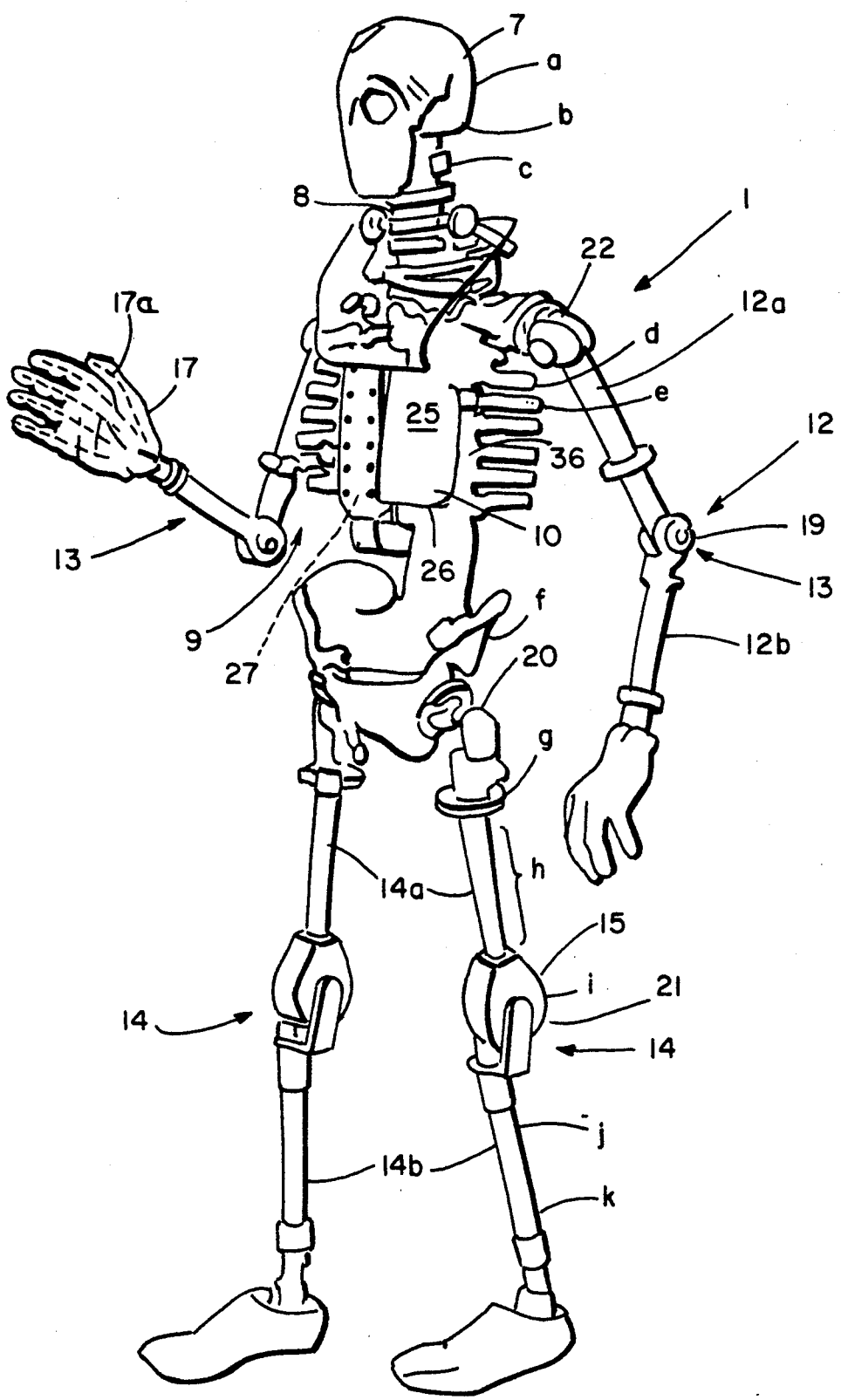
Figure 2:
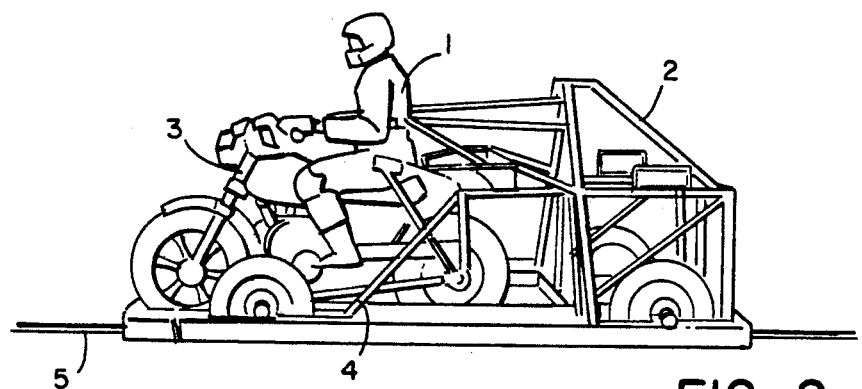
Figure 3:
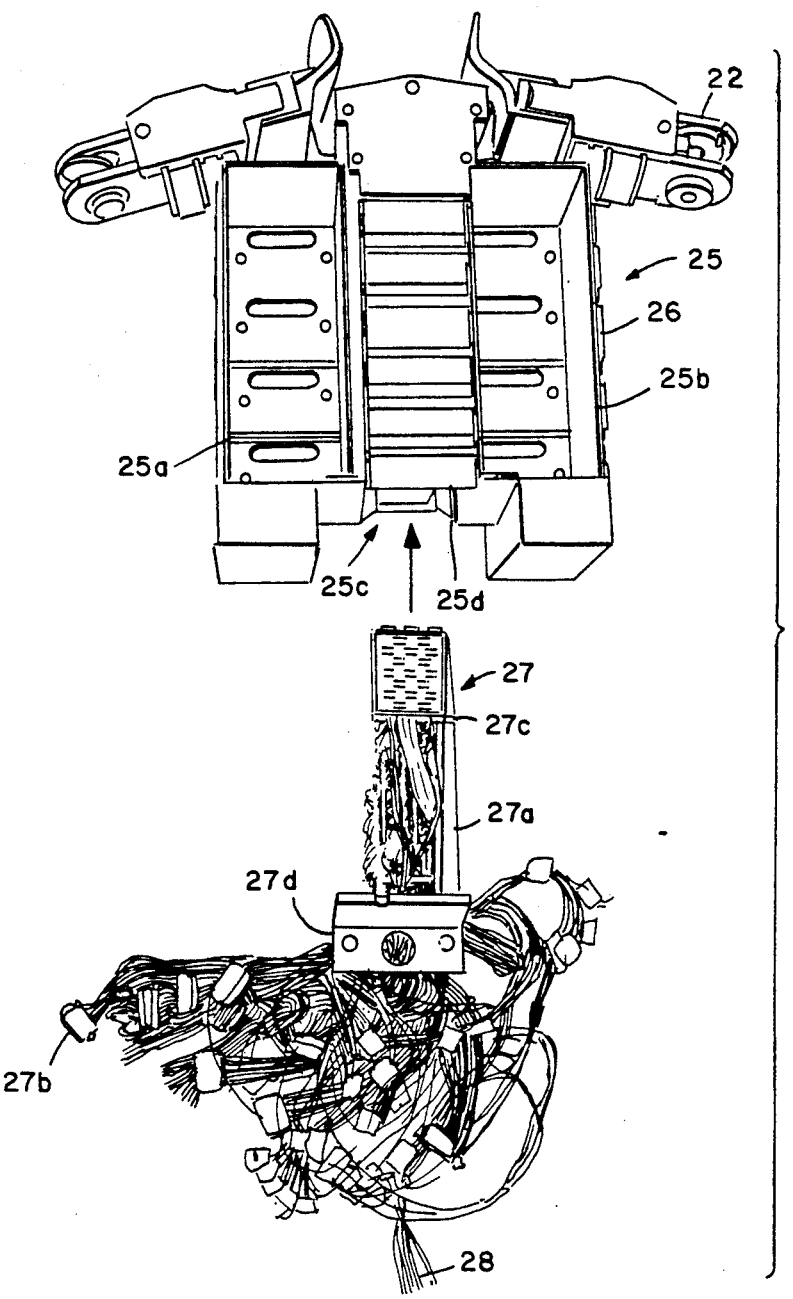
Figure 4:
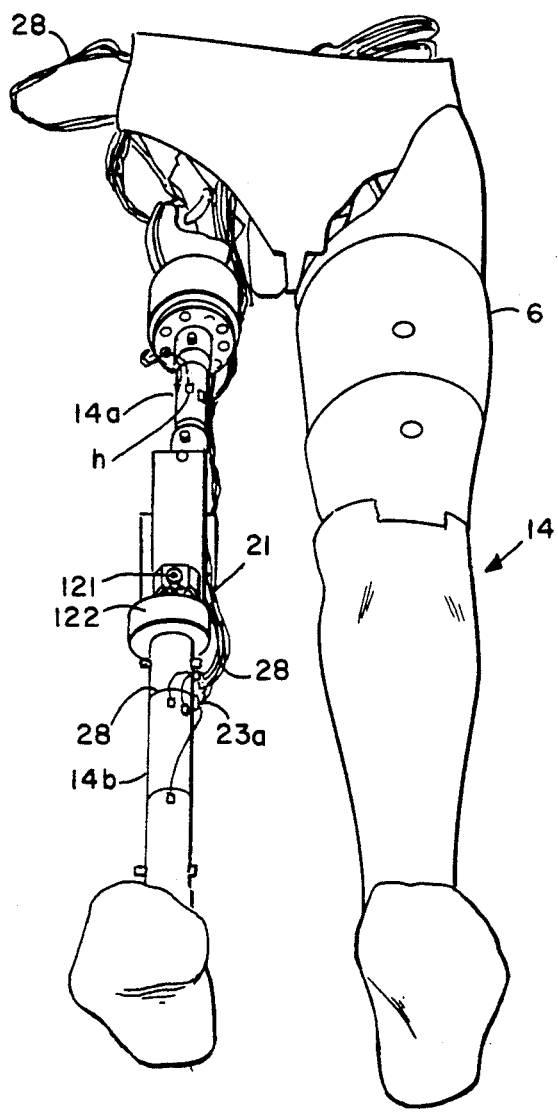
Figure 5:
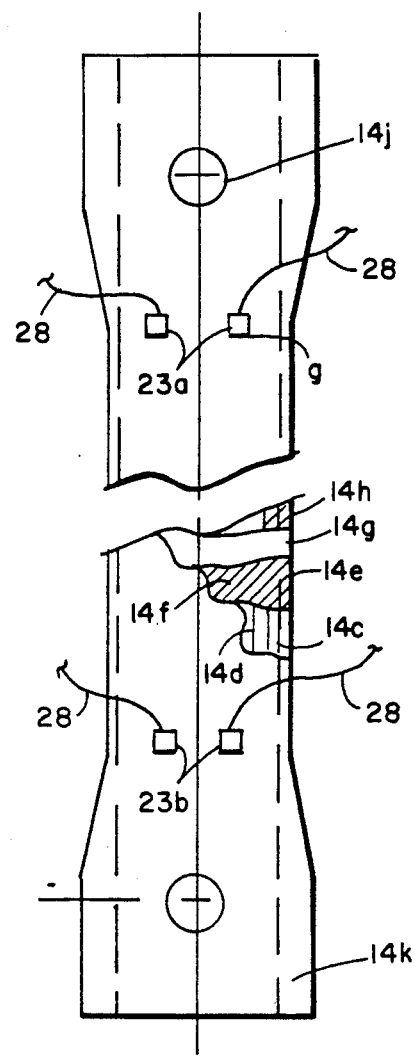
Figure 6:
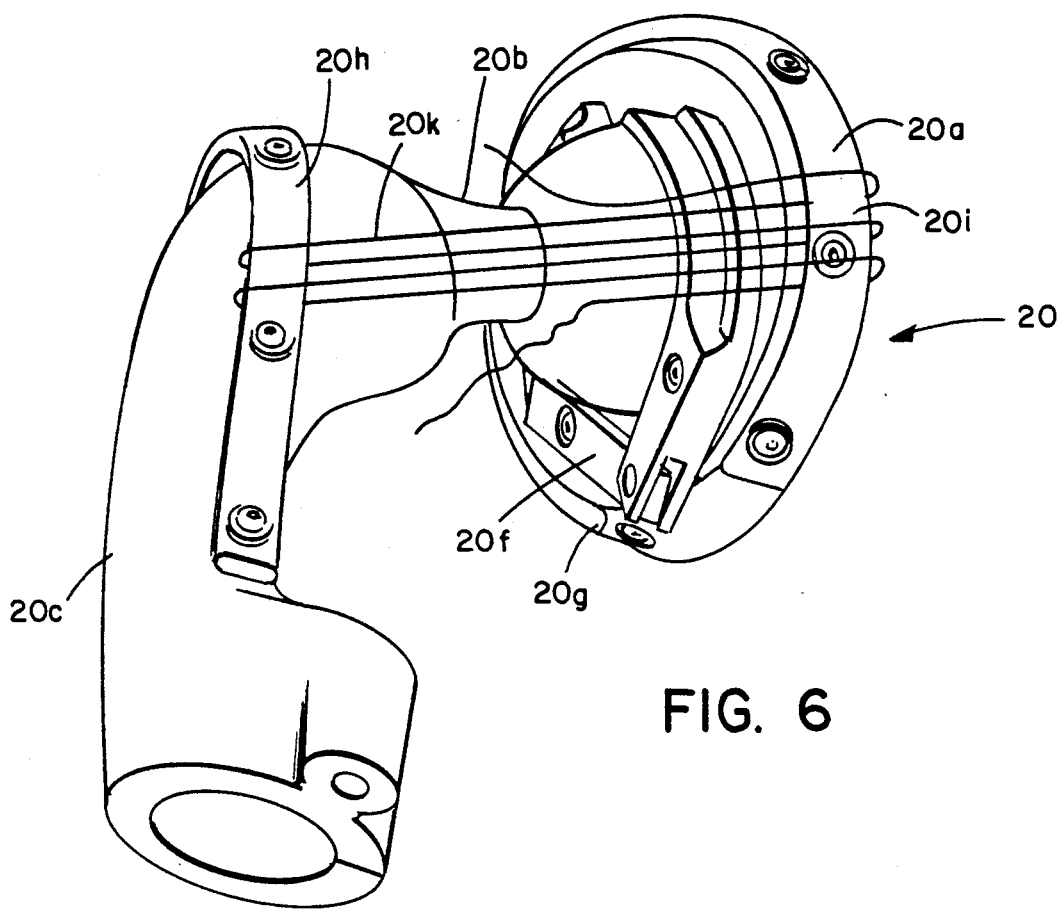
Figure 7:
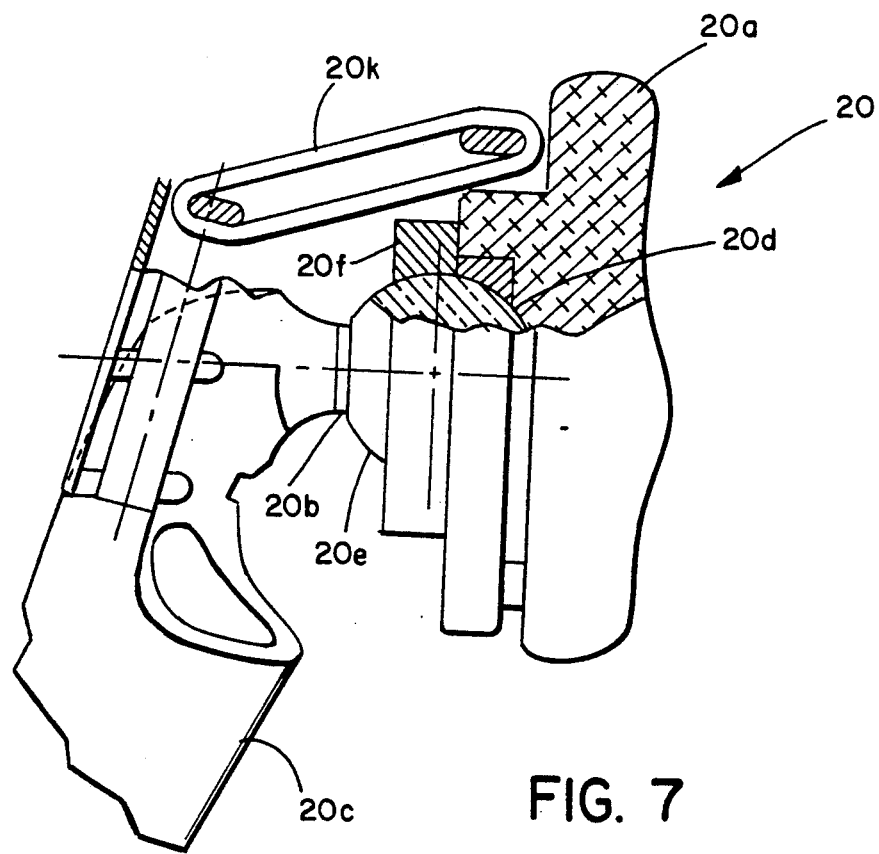
Figure 8:
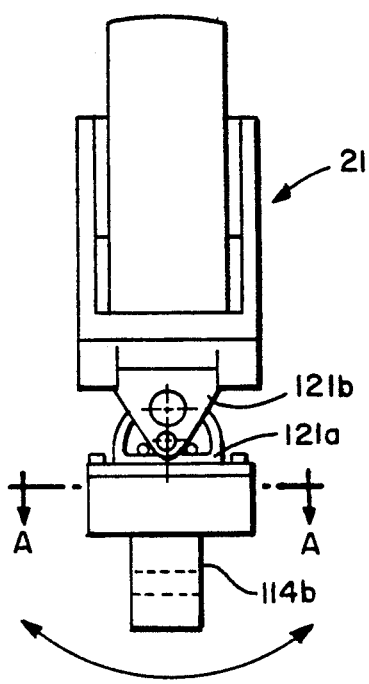
Figure 9:
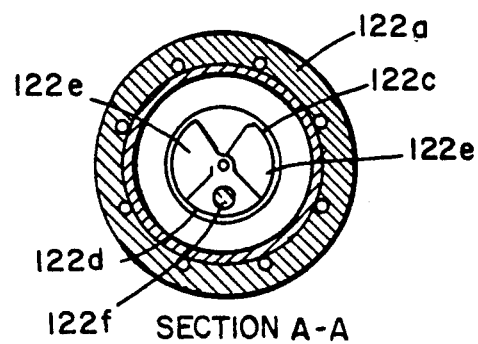
Figure 10:
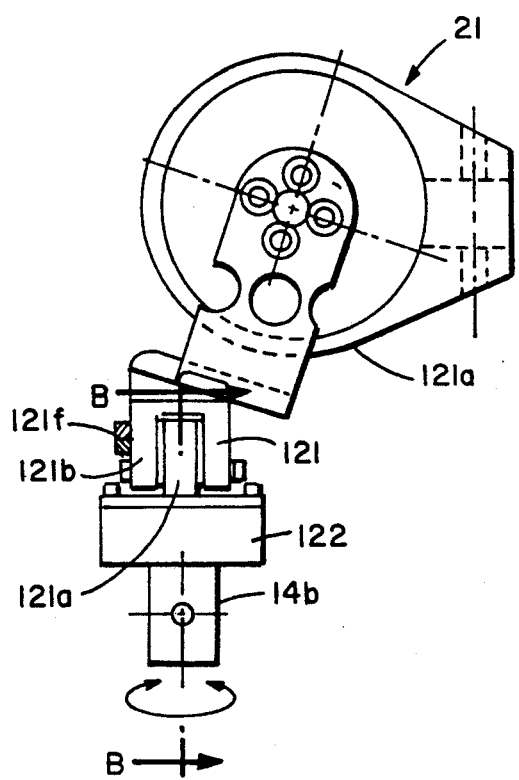

FIG. 1 provides a schematic elevational view of a test dummy of the present invention intended to be utilized in motorcycle accident simulation, this dummy being devoid of the external, skin simulating coating which is ordinarily employed therewith;

FIG. 2 provides a schematic, side elevational view illustrating the test dummy of FIG. 1 mounted on a test motorcycle, with the dummy being provided with a skin simulating coating, outer clothing, etc.;

FIG. 3 provides a schematic, elevational, "exploded" view of a data receiving and housing module of the present invention which is entirely incorporated within the thorax section of the FIG. 1 test dummy showing a signal terminus separated therefrom;

FIG. 4 provides a schematic, fragmentary view of a lower limb portion of the FIG. 1 test dummy, illustrating the left leg with skin simulating covering applied thereto and illustrating the right leg with such covering removed for servicing, evaluation purposes;

FIG. 5 provides a side elevational view of a simulated, frangible tibia section fabricated in accordance with the present invention;

FIG. 6 provides a schematic, perspective view illustrating a simulated dislocatable hip joint of the present invention;

FIG. 7 provides a transverse sectional view of the FIG. 6 simulated hip joint assembly;

FIG. 8 provides a front elevational view of a unique simulated knee joint which may be incorporated in the FIG. 1 test dummy;

FIG. 9 provides a sectional view through the FIG. 8 assembly, as viewed along section line A—A;

FIG. 10 provides a side elevational view of the FIG. 8 assembly; and

Figure 11:
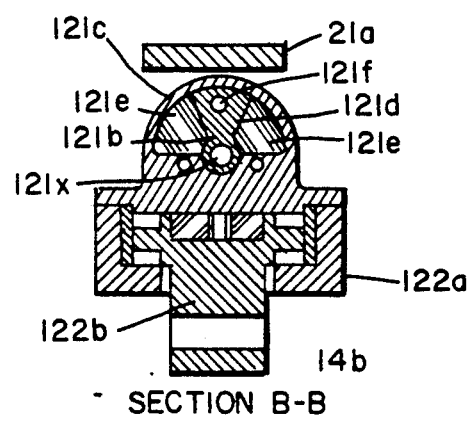

FIG. 11 provides a cross-sectional view of the FIG. 10 assembly as viewed along section line B—B of FIG. 10.

DESCRIPTION OF THE PREFERRED EMBODIMENTS

In describing presently preferred embodiments reference will be made to appended drawings comprising FIGS. 1 through 11.

These drawings depict the general arrangement of a motorcycle accident simulating test dummy 1. This test dummy is to be fabricated in accordance with the present invention and is intended, for example, to be used with a now recognized and conventional motorcycle simulating test array 2 of the type shown in FIG. 2.

As shown in FIG. 2, the motorcycle accident simulating test dummy 1 is releasably mounted on a test motorcycle 3 included in the test array 2. The dummy hands releasably grip the cycle handlebars but the remainder of the dummy sit "freely" on the cycle seat, as would a normal driver.

In array 2, the motorcycle is releasably mounted for forward impacting movement on a frame 4. Frame 4 is supported on a support surface or track means 5 and is operable to be impelled forward (to the left as shown in FIG. 2) by movement producing means (not shown). Such movement producing means may comprise a cable, propulsion means, etc.

In performing conventional test operations, with the arrangement shown in FIG. 2, the frame 4 would be propelled to the left and caused to engage a stop or abutment in its path. At this point, the frame 4 would cease its movement and the motorcycle 3 with the mounted test dummy 1 would be carried forward, simulating normal free motorcycle and driver movement. Depending upon the nature of the test, the then free motorcycle and test dummy would be impelled into a desired accident simulating situation, i.e. into another vehicle or obstacle. The damage imposed upon the test dummy and the stress and/or strain conditions and/or acceleration conditions monitored during the test would provide observers with an indication of what would have been likely to occur in a real-life situation i.e. provide an indication of injuries which would have been expected to have been sustained by a driver during such a situation.

Turning now to FIG. 1, the basic internal structure of the test dummy 1 will be described, it being recognized that FIG. 1 schematically illustrates the internal portions of the test dummy, with a removable epidermus or flexible skin simulating covering 6 removed.

A portion of such a flexible, human skin simulating cover 6 is depicted, for example in FIG. 4, generally covering the lower torso and left leg with the right leg of the test dummy 1 being exposed, generally as depicted in FIG. 1.

Overall Test Dummy Structure

The motorcycle accident simulating test dummy 1, as shown in FIG. 1, includes head mean 7, neck means 8, and body means 9 including thorax or chest/rib defining means 10. Limb means 11 include a pair of arm means 12 and 13, a pair of leg means 14 and 15, and a pair of hand means 16 and 17. Joint means provide articulated connecting means 18 between some portions of the limb means and either other portions of the limb means or the body means. Such connecting means 18 include a pair each of elbow joints 19, dislocatable hip joints 20, yieldable and ultimately frangible knee joints 21, and shoulder joints 22.

As shown in FIG. 1, the simulated left arm 12 may include an upper arm portion 12a pivotally connected by an elbow joint 13 to a lower or forearm portion 12b. Similarly, the same basic structure would be incorporated in the right arm.

Each of the leg structures may comprise an articulated assembly. Thus, as shown in FIG. 1, the left leg assembly 14 may comprise an upper femur 14a connected to a lower tibia section 14b by a frangible knee joint 15.

It is contemplated that some or all of the limb sections, such as the leg sections 14a and 14b will be fabricated from fracturable, i.e. frangible, material operable to fracture and visually reflect through breaking the sort of fractures which would be likely to occur with human drivers in motorcycle accident situations.

The dislocatable hip joints, the frangible knee joints, and the frangible limb segments are designed to yieldably resist applied force and ultimately fail. This will realistically simulate accident results, provide, through breaking, visual indications of fractures, dislocation etc., and permit the type of freedom of movement which occurs in accidents after fractures, dislocations, etc. have occurred.

Since the basic configuration of test dummies, including relatively moveably interconnected components, is a concept now well recognized in the art, as evidenced in part by the compilation of U.S. Patents set forth above, it is not deemed necessary to repeat structural details of conventional mechanisms which may be utilized in the practice of the invention if so desired.

Suffice it to say, those skilled in this art and familiar with the history of the art as evidenced by prior disclosures such as those set forth above and in the crash testing literature will readily avail themselves of suitable joint and linē structure elements to be used in association with the elements of the invention.

It will also be recognized that, in assessing injury, it will be appropriate to utilize load cells, accelerometers, and stress or strain gauges, by conventionally affixing such conventional mechanisms to appropriate areas in the test dummy. Conventional measuring means, commonly available "off-the-shelf" items, and generally described in the compilation of prior art set forth above and in the crash test literature may be turned to as a resource in selecting sensing and recording means appropriate to the circumstances of the test involved.

As shown in FIG. 1, it is presently contemplated that the test dummy 1 will be provided with a variety of test sensing means, generally located as shown in FIG. 1 and including:

a) Head Linear Accelerometer Means
b) Head Angular Accelerometer Means
c) Neck Load Cell Means
d) Chest Deflection Potentiometer Means
e) Chest Accelerometer Means
f) Pelvis Accelerometer Means
g) Upper Femur Load Cell Means
h) Femur Strain Gauge Means
i) Knee Strain Gauge Means
j) Upper Tibia Strain Gauge Means
k) Lower Tibia Strain Gauge Means Test dummy 1 comprises motorcycle handle bar gripping means 17a included in the hand means 17. Such may comprise internal, yielded, gripping segments contained within the hand means such as bendable metal rods, wires, spring means etc. Such devices are now known in the art, as evidenced by prior work of JAMA (Japanese Automobile Manufacturers Association). It is contemplated that the gripping means 17a will be operable to releasably connect the dummy and handle bar means of the motorcycle 3, so as to generally simulate human gripping action and provide the only connection (albeit releasable) between the dummy and the motorcycle, as in "real life".

The motorcycle handle bar gripping means 17a, by virtue of the yieldable holding action, will be operable to release the dummy 1 from the motorcycle handlebar means after gripping force, imposed by the motorcycle handlebar gripping means 17a on the handlebar means is overcome by the inertial forces imposed on the dummy during accident simulation. When cycle 3 impacts an obstacle, the inertial force acting on dummy 1 will tend to carry it over the top of the handlebars, causing hands 17 to release.

A first sensor means 23 is operable to sense at least one of stress and/or strain imposed on the limb means. This means may comprise for example, strain gauges arrays 23a and 23b mounted on tibia 14b as shown in FIG. 5. Such conventional sensor means identified by locations of j and k in FIG. 1, will be operable to generate first, electrical, data signal means in response to the sensing by this first sensor means 23 of strain acting on the tibia limb. Each tibia limb will include such strain gauge arrays. Similar sensor arrays will be provided for the femur segments.

A second sensor means 24 is operable to sense at least one of stress and/or strain imposed on the joint means. For example, such sensor means 24 may include the knee joint strain gauges i.

This said second sensor means 24 will be operable to generate second data signal means in response to knee joint strain sensing by the strain gauge means of second sensor means.

As shown in FIGS. 1 and 3, test dummy 1 includes a box-like, data receiving and storage means 25 which is operable to receive the data signal means from the first and second sensor means 23 and 24 and store such data within the thorax section 10. Details of this unit will be reviewed later in this disclosure. Suffice it at this point to observe that the housing and shock protecting means 25 includes a rugged housing 26 which wholly contains the unit 25 within the thorax means 10. Housing 26, in being rugged and tough, and desirable provided with shock mounting or cushioning means, is operable to shield the data receiving means from forces imposed on the dummy during accident simulation and may be mounted on the spine portion of dummy 1, i.e. a downward continuation of neck means 8.

Signal transmitting means 27 are provided and comprise sensor leads or electrical signal transmitting wires such as leads 28 of FIG. 5. These leads 28 are operable to transmit the first and second data signal means from the first and second sensor means to the data receiving and storage means 25. The signal transmitting means connector assembly, shown slid-out of the base of a center recess of unit 25 in FIG. 3, will be referred to in additional detail later in this disclosure.

The signal transmitting means 27 is contained entirely within the dummy 1, and is free of externally extending transmitting means, such as an umbilical cord. Such an external cord would be physically attached to means apart from said dummy and thus render free movement of the dummy during accident simulations.

The limb means 11 include frangible, fracture simulating means such as the femur elements 14a and tibia elements 14b. These frangible elements are operable to fracture in response to inertial stress or external forces imposed on the dummy during accident simulation. This frangible, fracture simulating means includes breakable and visually accessible limb base means which are capable of breaking in response to accident generated forces. This arrangement provides visual indicating means operable to provide a visual simulation of limb fracturing. It also affords means operable to permit relative movement between fractured limb means segments, thereby simulating relative freedom of movement of fractured limbs during simulated accidents. In other words, the simulated fracture will be able to be seen (by removing flexible skin cover 6 via zippers, velcro, etc.) and will permit the dynamics of relative movement of broken limb segments to occur.

Frangible Limb Structure

As above noted, it is contemplated that one or more limb portions included in the dummy 1 will be frangible in nature so as to provide both a visual indication of a simulated fracture and permit relative movement between fracture segments, simulating the dynamics of fractured leg segment movement which would be expected to occur in a normal accident situation.

By way of example, reference will be made to a frangible or fracturable tibia segment 14b shown, by way of example, in FIG. 5. In this connection however, it will be understood that each leg would have such a frangible tibia and that the femur sections as well would in all likelihood be frangible. Moreover, other segments could also be fabricated so as to be frangible or breakable in nature.

By way of example, reference will now be made to an exemplary frangible nature of the tibia 14b.

The tibia 14b portion of the leg means includes multiple cylindrical laminates affording individually controllable, diversely oriented strength (i.e. breaking) characteristics or patterns.

Thus a first cylindrical fiberglass laminate means 14c includes first fiber reinforcing means 14d extending longitudinally of tibia portion 14b. This reinforcing is controlled by layering and fiber size, etc. so as to provide a predetermined degree of reinforcement in the longitudinal direction of the tibia 14b.

A second cylindrical, fiberglass laminate means 14e include second reinforcing means 14f extending generally helically of the longitudinal axes of tibia 14b. Wrapping 14e provides reinforcement in a direction extending generally helically of the longitudinal tibia axis.

The longitudinally extending and generally helically extending first and second reinforcing means 14e and 14f provide separately oriented, reinforcing patterns intended to simulate multi-directional, diverse strength characteristics. This enables realistic simulation of transverse and spiral fracturing to be provided and evaluated.

The two laminate layers 14c and 14e may be wrapped on a core 14g which may be internally supported by internal, longitudinally spaced rings 14h.

As will be recognized, the laminate layers 14c and 14e comprise a composite cylindrical frangible base tube and preferably is fabricated from fiberglass constituents i.e., fiberglass fabric and resin base. In addition, it is presently believed that a satisfactory assembly technique would involve the "laying up" of the base tube on a stabilizing core which may include a relatively thin wall 14g, the interior of which is supported by one or more spaced reinforcing rings such as the aluminum rings 14h depicted in FIG. 5.

Presently contemplated fabrication materials are as follows:

COMPOSITE FRANGIBLE BASE TUBE: 4 plies of Fiberite MXB7701/120 prepreg (2 oz./sq.yd. plain weave fiberglass fabric impregnated with 250° cure epoxy resin) spiral wrapped at ±30° to the tube's axis plus 2 plies of 3M Scotchply SP-250E prepreg (unidirectional Owens Corning 456 glass impregnated with 250° cure epoxy resin) wrapped with the fibers along the tube axis;

STABILIZING CORE: 0.25 inch thick, 0.125 inch wall, 6061-T6 aluminum rings spaced apart by 0.125 inch thick, 12 pcf, Clark foam discs.

The function of the internal stabilizing rings 14h is to provide internal reinforcing, preventing premature or undesired crushing of the cylindrical tube structure, thereby maintaining the basic integrity of the frangibility of the limb from a test evaluation stand point.

As will be recognized the end 14k portions of each of the limb segments, where they are interconnected with other components of the dummy i.e., joint structures etc., may be enlarged or reinforced as shown in FIG. 5 and provided with appropriate connecting means such as the connecting aperature means 14j shown in FIG. 5. Such arrangements permit pin mounting of limb segments with joint stubs, as shown, for example, in FIG. 8.

The connecting ends 14k, may be enlarged and reinforced with additional layers of fiberglass material to produce the desired structural strength at the component joining area.

Simulated Knee Joint Structure

The present invention is believed to present a significant improvement in the structure of a frangible knee joint.

In this sense, it is believed to constitute an advancement upon or improvement over the structure featured in the Denton et al. U.S. Pat. No. 1,488,433 set forth in the compilation above.

Thus, as shown in FIG. 10, the simulated knee joint 21 includes a slide-type upper knee component 21a, the structure and operation of which are fully described in the aforesaid Denton et al. patent. To the extent appropriate to this disclosure, the disclosure of the Denton et al. patent is herein incorporated by reference with respect to the upper knee and slide structure assembly 21a.

The present invention is directed to a unique multi-directional, lower knee joint assembly which in fact constitutes two assemblies, each of which affords elastically intensified resistance to movement while permitting ultimate fracturing or failure at a point where human limbs would be expected to fail, thereby simulating the normal dynamics of accident situations.

As depicted in FIGS. 8-11, this composite assembly includes one assembly 121 intended to permit lateral swinging movement of the dummy about the knee joint. The other assembly 122, integrated with the first assembly 121, is intended to permit torsional movement between the femur/knee joint and the tibia 14b.

The articulated connecting means 21 is thus operable to simulate human knee joint means and includes a first and second assembly 121 and 122 as shown in FIGS. 8-11. Assembly 121 permits lateral tilting movement, i.e. varus-valgus rotation and assembly 122 permits torsional rotation, as shown in FIGS. 8 and 10.

The assemblies each include the same basic structural elements such that assembly 121 will be described in detail, recognizing the equivalent elements in assembly 122 will be identified with the same suffix.

Thus, assembly 121 includes a first movable member 121a and a second movable member 121b. Arcuate 121c slot means on member 121a and frangible pin means 121d pivotally mounted on member 121b, as shown in FIG. 11, interconnect the first and second movable members 121a and 121b and provide limited arcuate, lateral movement therebetween as determined by arcuate traversing movement of the pin means 121d through the slot means 121c.

Elastomeric body means 121e, interposed in the slot means 121c between the slot walls of member 121a and the pin means 121d, on each side thereof, is operable to elastically and progressively increase resistance of tilting movement of member 121b about its lower pivot 121x relative to member 121a in response to arcuate movement of the pin means 121d through the slot means 121c. When a level simulating bone fracture loads is experienced a shear pin 121f, connecting pin means 121d and member 121b, will fail. This will simulate knee fracturing and failure.

The pair of assemblies 121 and 122 are oriented with the assembly 121 having a pivot axis extending longitudinally of the motorcycle 3 and operable to permit lateral tilting of the dummy 1 relative thereto.

The other assembly 122 has its pivot axis extending vertically so as to permit upright torsional movement of the dummy 1 relative to the motorcycle 3.

Simulated Dislocatable Hip Joint With Ligament Restraint

The test dummy 1 of the present invention may be uniquely provided with an optimized, dislocatable hip joint assembly 20 as generally depicted in FIGS. 6 and 7.

The articulated connecting means unit which comprises the simulated hip joint 20 thus includes hip socket means 20d included in base 20a, upper femur means 20c, and ball means 20e. This ball means 20e is carried by segment 20c and is releasably engaged with the concave socket means 20d. It moveably interconnects the hip socket means 20d and the femur means 20c and 14a in a human hip-like manner.

A frangible clamp ring 20f defines selectively rupturable holding means operable to secure the ball means 20e to the hip socket or cavity 20d means and permit release of the femur means 20c from the hip socket means 20d in response to a predetermined separation force imposed on the simulated hip joint 20. When this force is imposed, a shear pin 20g holding the separable ends of clamp 20f fails, allowing the clamp to release the ball 20e from socket 20d.

Ligament anchoring means are carried by each of the ball means 20b and said hip socket means 20d and may comprise mounting plates or strips 20h and 20i, curving partially around these elements is shown in FIG. 6.

Elongate, elastic, ligament simulating means comprising resilient wire or filament 20k, operable to provide a contracting force acting between the ligament anchoring means 20a and 20i, are carried by and extend between the ball means and hip socket means. Thus filament tends to releasably retain the ball means in the hip socket means 20d by applying a prestressing or socketing force, urging the ball into its socket. The wire or filament means may comprise continuous strand means wound upon and between the mounting brackets 20r and 20i as shown in FIGS. 6 and 7. The filament means may be made of elastic, plastic, metal, fiberglass, composite fibers depending upon the holding forces, etc. to be achieved.

The representative left knee joint 20 depicted in FIGS. 6 and 7 is thus designed to simulate the possibility of hip dislocations as might occur during a motorcycle accident while providing the unique anti-dislocation resisting restraint as would be afforded by body ligament structures, etc.

To this end, as shown in FIGS. 6 and 7, the hip joint 20 includes the plate-like base member 20a which is secured to the lower body portion of the dummy 1 as shown in FIG. 1. The dislocatable or separable ball and socket assembly 20b and an angular limb simulating means 20c provides a connection between the ball portion 20e of the connection 20b and the femur limb port(on 14a.

Protection of Data Acquisition Means

FIGS. 1 and 3 depict an arrangement which affords unique protection for the data acquisition portion of the test dummy 1.

The data receiving module 25 is mounted by way of its rugged external housing means 26, within the thorax portion 10 of the dummy 1 so as to totally encase and house and provide shock protection for the data acquisition units themselves. Such mounting may entail securing of the casing 26 to segments of the dummy spine.

As is shown in FIG. 3, it is contemplated that the assembly 25 would include upright arrays of data storing assemblies 25a and 25b disposed on opposite lateral sides of a central, upright cavity 25c.

A signal transmitting terminus assembly 27 includes a plurality of signal processing boards 27a which are connected to sensor leads 28 extending from the various sensor input gauges in the dummy. As is schematically shown in FIG. 3, output from the processing boards 27a may be connected by conventional electrical pin connection means 27b to appropriate module connecting locations in the data receiving and storing module areas 25a and 25b.

With this arrangement, the terminus portion 27c of the signal transmitting means 27 would be slid upwardly into the cavity 25c and a base plate 27d secured to the base area 25d at the lower end of the housing 26. In this manner, the signal transmitting terminus is effectively protected by the rugged and desireably cushioned housing 26 of the lateral shielding afforded by the data receiving and storing modules 25a and 25b i.e., the circuit boards and the terminus 27a are laterally shielded by the rugged outer housing 26.

Thus, the housing and shock protecting means 25 includes a first, generally upright, data receiving module assembly 25a wholly contained within the thorax means 10 and a second, generally upright, data receiving module assembly 25b, also wholly contained within the thorax means 20 and protected by housing 26.

The signal transmitting means 27 includes a connecting means 27a bundled in an assembly and positioned between the first and second upright data receiving modules 25a and 25b within the thorax means 10. These first and second, upright data receiving module assemblies 25a and 25b are thus operable to laterally shield the signal transmitting means 27a contained therebetween.

As will be understood, those skilled in the art may avail themselves of a variety of commercially available data receiving and storing modules, circuit processing boards, circuit connecting means etc., the selection of which, apart from the teachings of this invention, would be deemed to be within the skill of those practicing in the instrumentation art.

Summary of Test Method

With the overall structure of the test dummy 1 having been described in detail, and with structural aspects of individual components having been further described, it is now appropriate to "over-view" the invention by summarizing the method of simulating a motorcycle accident utilizing the test dummy of the invention.

In performing this method of simulating a motorcycle accident with the test dummy, it will first be recalled that dummy 1 includes:
head means 7;
neck means 8;
body means 9 including
  thorax means 10;
limb means 11 including at least one of
  arm means 12, 13 and
  leg means 14, 15;
hand means 16, 17; and
joint means providing articulated connecting means 18
  between at least a portion of the limb means 11 and at least one of another portion of the limb means 11 or the body means 10.

The method entailed in conducting motorcycle accident simulations comprises:
providing, in the test dummy, motorcycle handle bar gripping means 17a
  included in said hand means 17b, and
  operable to releasably connect the dummy 1 and motorcycle handle bar means;
disposing the motorcycle handle bar gripping means 17a so as to be operable to grip the handle bars yet release the dummy 1 from the motorcycle handle bar means after gripping force, imposed by the motorcycle handle bar gripping means 17a on the handle bar means is overcome by the inertial forces imposed on said dummy 1 during accident simulation;
providing first sensor means 23 in the dummy 1 operable to sense at least one of stress and/or strain imposed on said limb means 11,
  the first sensor means 23 being operable to generate first data signal means in response to the sensing by the first sensor means 23;

providing second sensor means 24 in the dummy 1 operable to sense at least one of stress and/or strain imposed on the joint means 11,
  the second sensor means being operable to generate second data signal means in response to the sensing by the second sensor means 24;
providing data receiving and storage means 25 in the dummy 1 operable to receive the data signal means from at least one of the first and second sensor means 23, 24 and store such data within the thorax means 10;
housing and shock protecting the data receiving means 25 with housing 26 wholly within the thorax means and shielding the data receiving means 25 with the thorax means 10, 26 from forces imposed on the dummy during accident simulation;
providing signal transmitting means 27 operable to transmit at least one of the first and second data signal means from the first and second sensor means 23, 24 to the data receiving and storage means 25,
  the signal transmitting means being contained entirely within the dummy 1 and being free of externally extending transmitting means physically attached to any means apart from the dummy; and
providing in the limb means of the dummy frangible fracture simulating means 14a, 14b, etc. operable to fracture in response to inertial stress or external forces imposed on the dummy during accident simulation, such frangible, fracture simulating means including
  visual indicating means 14a, 14b operable to break so as to provide a visual simulation of limb fracturing, and
means 14a, 14b operable to break and thus permit relative movement between fractured limb means segments simulating relative freedom of movement of fractured limbs during simulated accidents.

Preferably, in the practice of this method, the dislocatable hip joint means 20 and frangible knee joint means 21 of the invention are employed.

SCOPE OF THE INVENTION

Those skilled in the art of accident simulation testing and instrumentation and familiar with this disclosure may recognize additions, deletions, substitutions, equivalents, or other modifications, any and/or all of which would fall within and be encompassed by the scope of the invention as set forth in the appended claims.

What is claimed is:

1. A motorcycle accident simulating test dummy, said dummy having
  body means;
  limb means including at least one of
    arm means, and
    leg means;
  hand means; and
  joint means providing articulated connecting means between at least a portion of said limb means and at least one of another portion of said limb means or said body means,
said dummy comprising:
  motorcycle handle bar gripping means
    included in said hand means, and
    operable to releasably connect said dummy and motorcycle handle bar means;
  said motorcycle handle bar gripping means being operable to release said dummy from said motorcycle handle bar means after gripping force, imposed by said motorcycle handle bar gripping means on said handle bar means is overcome by the inertial forces imposed on said dummy during accident simulation;
  sensor means operable to sense an accident simulating condition imposed on said limb means,
    said sensor means being operable to generate data signal means in response to said sensing by said sensor means;
  data receiving and storage means operable to receive said data signal means from said sensor means and store said data within said body means;
  housing and shock protecting means housing said data receiving means wholly contained within said body means and operable to shield said data receiving means from forces imposed on said dummy during accident simulation;
  signal transmitting means operable to transmit said data signal means from said sensor means to said data receiving and storage means,
    said signal transmitting means being contained entirely within said dummy and being free of externally extending transmitting means physically attached to any means apart from said dummy; and
  said limb means including frangible fracture simulating means operable to fracture in response to inertial stress or external forces imposed on said dummy during accident simulation, said frangible, fracture simulating means including
    visual indicating means operable to provide a visual simulation of limb fracturing, and
    means operable to permit relative movement between fractured limb means segments simulating relative freedom of movement of fractured limbs during simulated accidents.

2. A motorcycle accident simulating test dummy as described in claim 1 wherein:
  said limb means includes, in at least one portion of said arm means or leg means,
    first laminate means including first reinforcing means extending longitudinally of said portion and providing a predetermined degree of reinforcement in the longitudinal direction of said portion, and
    second laminate means including second reinforcing means extending generally helically of said longitudinal direction and providing reinforcement in a direction generally helically related to said longitudinal direction;
  said longitudinally extending and helically extending first and second reinforcing means providing separately oriented reinforcing patterns intended to simulate multi-directional, diverse strength characteristics.

3. A motorcycle accident simulating test dummy as described in claim 1 wherein;
  said articulated connecting means is operable to simulate knee joint means and includes a first and second assembly, each having
    a first movable member,
    a second movable member,
    slot means and pin means interconnecting said first and second movable members and providing limited movement therebetween as determined by traversing movement of said pin means through said slot means; and
    elastomeric means interposed in said slot means between one of said members and said pin means and operable to elastically and progressively increase resistance of movement of the other of said members relative to said one member in response to movement of said pin means through said slot means;

said pair of said assemblies being oriented with
one assembly having a pivot axis extending longitudinally of said motorcycle and operable to permit lateral tilting of said dummy relative thereto, and
the other of said assemblies having a pivot axis extending vertically and permitting upright torsional movement of said dummy relative to said motorcycle.

4. A motorcycle accident simulating test dummy as described in claim 1 wherein said articulated connecting means comprises a simulated hip joint, including:
hip socket means;
femur means;
ball means releasably engaged with said socket means and moveably interconnecting said hip socket means and femur means;
selectively rupturable holding means operable to secure said ball means to said hip socket means and permit release of said femur means from said hip socket means in response to a predetermined separation force imposed on said simulated hip joint;
ligament anchoring means carried by each of said ball means and said hip socket means; and
elongate, elastic, ligament simulating means operable to provide a contracting force acting between said ligament anchoring mean carried by each of said ball means and hip socket means, thereby tending to releasably retain said ball mean in said hip socket means.

5. A motorcycle accident simulating test dummy, said dummy head means;
head means;
neck means;
body means including
thorax means;
limb means including at least one of
arm means, and
leg means;
hand means; and
joint means providing articulated connecting means between at least a portion of said limb means and at least one of another portion of said limb means or said body means;
said dummy comprising:
motorcycle handle bar gripping means
included in said hand means, and operable to releasably connect said dummy and motorcycle handle bar means,
said motorcycle handle bar gripping means being operable to release said dummy from said motorcycle handle bar means after gripping force, imposed by said motorcycle handle bar gripping means on said handle bar means is overcome by the inertial forces imposed on said dummy during accident simulation;
first sensor means operable to sense at least one of stress and/or strain imposed on said limb means,
said first sensor means being operable to generate first data signal means in response to said sensing by said first sensor means;
second sensor means operable to sense at least one of stress and/or strain imposed on said joint means, said second sensor means being operable to generate second data signal means in response to said sensing by said second sensor means;
data receiving and storage means operable to receive said data signal means from at least one of said first and second sensor means and store said data within said thorax means;
housing and shock protecting means housing said data receiving means wholly contained within said thorax means and operable to shield said data receiving means from forces imposed on said dummy during accident simulation;
signal transmitting means operable to transmit at least one of said first and second data signal means from said first and second sensor means to said data receiving and storage means,
said signal transmitting means being contained entirely within said dummy and being free of externally extending transmitting means physically attached to any means apart from said dummy; and
said limb means including frangible fracture simulating means operable to fracture in response to inertial stress or external forces imposed on said dummy during accident simulation, said frangible, fracture simulating means including
visual indicating means operable to provide a visual simulation of limb fracturing, and
means operable to permit relative movement between fractured limb means segments simulating relative freedom of movement of fractured limbs during simulated accidents.

6. A motorcycle accident simulating test dummy as described in claim 5 wherein:
said limb means includes, in at least one portion of said arm means or leg means,
first laminate means including first reinforcing means extending longitudinally of said portion and providing a predetermined degree of reinforcement in the longitudinal direction of said portion, and
second laminate means including second reinforcing means extending generally helically of said longitudinal direction and providing reinforcement in a direction generally helically related to said longitudinal direction;
said longitudinally extending and helically extending first and second reinforcing means providing separately oriented reinforcing patterns intended to simulate multi-directional, diverse strength characteristics;
said articulated connecting means is operable to simulate knee joint means and includes a first and second assembly, each having
a first movable member,
a second movable member; and
slot means and pin means rupturably interconnecting said first and second movable members and providing limited movement therebetween, prior to rupturing, as determined by traversing movement of said pin means through said slot means;
elastomeric means interposed in said slot means between one of said members and said pin means and operable to elastically and progressively increase resistance of movement of the other of said members relative to said one member in response to movement of said pin means through said slot means;

said pair of said assemblies being oriented with
one assembly having a pivot axis extending longitudinally of said motorcycle and operable to permit lateral tilting of said dummy relative thereto, and the other of said assemblies having a pivot axis extending vertically and permitting upright torsional movement of said dummy relative to said motorcycle; and said articulated connecting means comprises a simulated hip joint, including:
hip socket means;
femur means;
ball means releasably engaged with said socket means and moveably interconnecting said hip socket means and femur means;
selectively rupturable holding means operable to secure said ball means to said hip socket means and permit release of said femur means from said hip socket means in response to a predetermined separation force imposed on said simulated hip joint;
ligament anchoring means carried by each of said ball means and said hip socket means; and
elongate, elastic, ligament simulating means operable to provide a contracting force acting between said ligament anchoring means carried by each of said ball means and hip socket means, thereby tending to releasably retain said ball means in said hip socket means.

7. A motorcycle accident simulating test dummy, said dummy having
head means;
neck means;
body means including
thorax means;
limb means including at least one of
arm means, and
leg means;
hand means; and
joint means providing articulated connecting means between at least a portion of said limb means and at least one of another portion of said limb means or said body means;
said dummy comprising:
motorcycle handle bar gripping means
included in said hand means, and
operable to releasably connect said dummy and motorcycle handle bar means,
said motorcycle handle bar gripping means being operable to release said dummy from said motorcycle handle bar means after gripping force, imposed by said motorcycle handle bar gripping means on said handle bar means is overcome by the inertial forces imposed on said dummy during accident simulation;
first sensor means operable to sense at least one of stress and/or strain imposed on said limb means, said first sensor means being operable to generate first data signal means in response to said sensing by said first sensor means;
second sensor means operable to sense at least one of stress and/or strain imposed on said joint means, said second sensor means being operable to generate second data signal means in response to said sensing by said second sensor means;

data receiving and storage means operable to receive said data signal means from at least one of said first and second sensor means and store said data within said thorax means;
housing and shock protecting means housing said data receiving means wholly contained within said thorax means and operable to shield said data receiving means from forces imposed on said dummy during accident simulation; and
signal transmitting means operable to transmit at least one of said first and second data signal means from said first and second sensor means to said data receiving and storage means,
said signal transmitting means being contained entirely within said dummy and being free of externally extending transmitting means physically attached to any means apart from said dummy.

8. A motorcycle accident simulating test dummy as described in claim 7 wherein said housing and shock protecting means comprises:
a first, generally upright, data receiving module assembly wholly contained within said thorax means; and
a second, generally upright, data receiving module assembly wholly contained within said thorax means;
said signal transmitting means including connecting means bundled in an assembly and positioned between said first and second upright data receiving modules within said thorax means; and
said first and second, upright data receiving module assemblies being operable to laterally shield said signal transmitting means contained therebetween.

9. A motorcycle accident simulating test dummy, said dummy having
head means;
neck means;
body means including
thorax means;
limb means including at least one of
arm means, and
leg means;
hand means; and
joint means providing articulated connecting means between at least a portion of said limb means and at least one of another portion of said limb means or said body means;
said dummy comprising:
motorcycle handle bar gripping means
included in said hand means, and
operable to releasably connect said dummy and motorcycle handle bar means,
said motorcycle handle bar gripping means being operable to release said dummy from said motorcycle handle bar means after gripping force, imposed by said motorcycle handle bar gripping means on said handle bar means is overcome by the inertial forces imposed on said dummy during accident simulation;
first sensor means operable to sense at least one of motorcycle accident condition simulating, stress and/or strain imposed on said limb means,
said first sensor means being operable to generate first data signal means in response to said sensing by said first sensor means;
second sensor means operable to sense at least one of motorcycle accident condition simulating, stress and/or strain imposed on said joint means, said second sensor means being operable to generate second data signal means in response to said sensing by said second sensor means; and said limb means including frangible fracture simulating means operable to fracture in response to motorcycle accident condition simulating, inertial stress or external forces imposed on said dummy during accident simulation, said frangible, fracture simulating means including visual indicating means operable to provide a visual simulation of limb fracturing, and means operable to permit relative movement between fractured limb means segments simulating relative freedom of movement of fractured limbs during simulated motorcycle accident.

10. A method of simulating a motorcycle accident with a test dummy, where said dummy includes body means;

limb means including at least one of
arm means, and
leg means;

hand means; and joint means providing articulated connecting means between at least a portion of said limb means and at least one of another portion of said limb means or said body means, said method comprising:

providing in said test dummy motorcycle handle bar gripping means
included in said hand means, and
operable to releasably connect said dummy and motorcycle handle bar means;

said motorcycle handle bar gripping means being disposed so as to be operable to release said dummy from said motorcycle handle bar means after gripping force, imposed by said motorcycle handle bar gripping means on said handle bar means is overcome by the inertial forces imposed On said dummy during accident simulation;

providing sensor means in said dummy operable to sense an accident simulating condition imposed on said limb means, said sensor means being operable to generate data signal means in response to said sensing by said sensor means;

providing data receiving and storage means in said dummy operable to receive said data signal means from said sensor means and store said data within said body means;

housing and shock protecting said data receiving means wholly within said body means and shielding said data receiving means with said body means from forces imposed on said dummy during accident simulation;

providing signal transmitting means operable to transmit said data signal means from said sensor means to said data receiving and storage means, said signal transmitting means being contained entirely within said dummy and being free of externally extending transmitting mean physically attached to any means apart from said dummy; and providing in said limb means of said dummy, frangible, fracture simulating means operable to fracture in response to inertial stress or external forces imposed on said dummy during accident simulation, said frangible, fracture simulating means including visual indicating means operable to provide a visual simulation of limb fracturing, and means operable to permit relative movement between fractured limb means segments simulating relative freedom of movement of fractured limbs during simulated accidents.

11. A method of simulating a motorcycle accident with a test dummy as described in claim 10 further comprising:

providing in said limb means, in at least one portion of said arm means or leg means,
first laminate means including first reinforcing means extending longitudinally of said portion and providing a predetermined degree of reinforcement in the longitudinal direction of said portion, and
second laminate means including second reinforcing means extending generally helically of said longitudinal direction and providing reinforcement in a direction generally helically related to said longitudinal direction;

said longitudinally extending and helically extending first and second reinforcing means providing separately oriented reinforcing patterns intended to simulate multi-directional, diverse strength characteristics.

12. A method of simulating a motorcycle accident with test dummy as described in claim 10 further comprising:

providing through said articulated connecting means a simulated knee joint means including a first and second assembly, each having
a first movable member,
a second movable member, and
slot means and pin means interconnecting said first and second movable members and providing limited movement therebetween as determined by traversing movement of said pin means through said slot means; and providing elastomeric means interposed in said slot means between one of said members and said pin means and operable to elastically and progressively increase resistance of movement of the other of said members relative to said one member in response to movement of said pin means through said slot means;

orienting said pair of said assemblies with
one assembly having a pivot axis extending longitudinally of said motorcycle and operable to permit lateral tilting of said dummy relative thereto, and
the other of said assemblies having a pivot axis extending vertically and permitting upright torsional movement of said dummy relative to said motorcycle.

13. A method of simulating a motorcycle accident with a test dummy as described in claim 10 wherein said articulated connecting means includes a simulated hip joint, said simulated hip joint:

providing hip socket means;
providing femur means;
providing ball means releasably engaged with said socket means and moveably interconnecting said hip socket means and femur means;
providing selectively rupturable holding means operable to secure said ball means to said hip socket means and permit release of said femur means from said hip socket means in response to a predetermined separation force imposed on said simulated hip joint;

providing ligament anchoring means carried by each of said ball means and said hip socket means; and providing elongate, elastic, ligament simulating means operable to provide a contracting force acting between said ligament anchoring means carried by each of said ball means and hip socket means, thereby tending to releasably retain said ball means in said hip socket means.

14. A method of simulating a motorcycle accident with a test dummy, where said dummy includes
head means;
neck means;
body means including
thorax means;
limb means including at least one of
arm means, and
leg means;
hand means; and
joint means providing articulated connecting means between at least a portion of said limb means and at least one of another portion of said limb means or said body means;
said method comprising:
providing in said test dummy motorcycle handle bar gripping means
included in said hand means, and
operable to releasably connect said dummy and motorcycle handle bar means;
said motorcycle handle bar gripping means being disposed so as to be operable to release said dummy from said motorcycle handle bar means after gripping force, imposed by said motorcycle handle bar gripping means on said handle bar means is overcome by the inertial forces imposed on said dummy during accident simulation;
providing first sensor means in said dummy operable to sense at least one of stress and/or strain imposed on said limb means,
said first sensor means being operable to generate first data signal means in response to said sensing by said first sensor means;
providing second sensor means in said dummy operable to sense at least one of stress and/or strain imposed on said joint means,
said second sensor means being operable to generate second data signal means in response to said sensing by said second sensor means;
providing data receiving and storage means in said dummy operable to receive said data signal means from at least one of said first and second sensor means and store said data within said thorax means;
housing and shock protecting said data receiving means wholly within said thorax means and shielding said data receiving means with said thorax means from forces imposed on said dummy during accident simulation;
providing signal transmitting means operable to transmit at least one of said first and second data signal means from said first and second sensor means to said data receiving and storage means,
said signal transmitting means being contained entirely within said dummy and being free of externally extending transmitting means physically attached to any means apart from said dummy; and providing in said limb means of said dummy frangible fracture simulating means operable to fracture in response to inertial stress or external forces imposed on said dummy during accident simulation,
said frangible, fracture simulating means including visual indicating means operable to provide a visual simulation of limb fracturing, and
means operable to permit relative movement between fractured limb means segments simulating relative freedom of movement of fractured limbs during simulated accidents.

15. A method of simulating a motorcycle accident with a test dummy as described in claim 14 further comprising:
providing through said limb means, in at least one portion of said arm means or leg means,
first laminate means including first reinforcing means extending longitudinally of said portion and providing a predetermined degree of reinforcement in the longitudinal direction of said portion, and
second laminate means including second reinforcing means extending generally helically of said longitudinal direction and providing reinforcement in a direction generally helically related t said longitudinal direction;
said longitudinally extending and helically extending first and second reinforcing means providing separately oriented reinforcing patterns intended to simulate multi-directional, diverse strength characteristics;
said articulated connecting means being operable to simulate knee joint means and including a first and second assembly, each
providing a first movable member,
providing a second movable member, and
providing rupturable slot means and pin means frangibly interconnecting said first and second movable members and providing limited movement therebetween, prior to rupturing, as determined by traversing movement of said pin means through said slot means;
providing elastomeric means interposed in said slot means between one of said members and said pin means and operable to elastically and progressively increase resistance of movement of the other of said members relative to said one member in response to movement of said pin means through said slot means;
orienting said pair of said assemblies with
one assembly having a pivot axis extending longitudinally of said motorcycle and operable to permit lateral tilting of said dummy relative thereto, and
the other of said assemblies having a pivot axis extending vertically and permitting upright torsional movement of said dummy relative to said motorcycle; and
providing through said articulated connecting means a simulated hip joint including
hip socket means,
femur means, and
ball means releasably engaged with said socket means and moveably interconnecting said hip socket means and femur means;
providing selectively rupturable holding means operable to secure said ball means to said hip socket means and permit release of said femur means from said hip socket means in response to a predetermined separation force imposed on said simulated hip joint;
providing ligament anchoring means carried by each of said ball means and said hip socket means; and
causing said elongate, elastic, ligament simulating means operable to provide a contracting force acting between said ligament anchoring means carried by each of said ball means and hip socket means, thereby tending to releasably retain said ball means in said hip socket means.

16. A method of simulating a motorcycle accident with a test dummy, where said dummy includes
head means;
neck means;
body means including
thorax means;
limb means including at least one of
arm means, and
leg means;
hand means; and
joint means providing articulated connecting means between at least a portion of said limb means and at least one of another portion of said limb means or said body means;
said method comprising:
providing in said test dummy motorcycle handle bar gripping means
included in said hand means, and
operable to releasably connect said dummy and motorcycle handle bar means;
said motorcycle handle bar gripping means being disposed so as to be operable to release said dummy from said motorcycle handle bar means after gripping force, imposed by said motorcycle handle bar gripping means on said handle bar means is overcome by the inertial forces imposed on said dummy during accident simulation;
providing first sensor means in said dummy operable to sense at least one of stress and/or strain imposed on said limb means,
said first sensor means being operable to generate first data signal means in response to said sensing by said first sensor means;
providing second sensor means in said dummy operable to sense at least one of stress and/or strain imposed on said joint means,
said second sensor means being operable to generate second data signal means in response to said sensing by said second sensor means;
providing data receiving and storage means in said dummy operable to receive said data signal means from at least one of said first and second sensor means and store said data within said thorax means;
housing and shock protecting said data receiving means wholly within said thorax means and shielding said data receiving means with said thorax means from forces imposed on said dummy during accident simulation; and
providing signal transmitting means operable to transmit at least one of said first and second data signal means from said first and second sensor means to said data receiving and storage means,
said signal transmitting means being contained entirely within said dummy and being free of externally extending transmitting means physically attached to any means apart from said dummy.

17. A method of simulating a motorcycle accident with a test dummy as described in claim 16 wherein through said housing and shock protecting means:
there is further provided a first, generally upright, data receiving module assembly wholly contained within said thorax means; and
there is further provided a second, generally upright, data receiving module assembly wholly contained within said thorax means;
bundling a terminal position of said signal transmitting means, including connecting means, in an assembly and position said assembly between said first and second upright data receiving modules within said thorax means; and
utilizing said first and second, upright data receiving module assemblies to laterally shield said signal transmitting means contained therebetween.

18. A method of simulating a motorcycle accident with a test dummy, where said dummy includes
head means;
neck means;
body means including
thorax means;
limb means including at least one of
arm means, and
leg means;
hand means; and
joint means providing articulated connecting means between at least a portion of said limb means and at least one of another portion of said limb means or said body means;
said method comprising:
providing in said test dummy motorcycle handle bar gripping means
included in said hand means, and
operable to releasably connect said dummy and motorcycle handle bar means;
said motorcycle handle bar gripping means being disposed so as to be operable to release said dummy from said motorcycle handle bar means after gripping force, imposed by said motorcycle handle bar gripping means on said handle bar means is overcome by the inertial forces imposed on said dummy during accident simulation;
providing first sensor means in said dummy operable to sense at least one of motorcycle accident condition simulating, stress and/or strain imposed on said limb means,
said first sensor means being operable to generate first data signal means in response to said sensing by said first sensor means;
providing second sensor means in said dummy operable to sense at least one of motorcycle accident condition simulating stress and/or strain imposed on said joint means,
said second sensor means being operable to generate second data signal means in response to said sensing by said second sensor means; and
providing in said limb means of said dummy frangible fracture simulating means operable to fracture in response to motorcycle accident condition simulating, inertial stress or external forces imposed on said dummy during accident simulation, said frangible, fracture simulating means including
visual indicating means operable to provide a visual simulation of limb fracturing, and
means operable to permit relative movement between fractured limb means segments simulating relative freedom of movement of fractured limbs during simulated motorcycle accidents.

19. A motorcycle accident simulating test dummy, said dummy having
head means;
neck means;
body means including
thorax means;
limb means including at least one of
arm means, and
leg means;
hand means; and
joint means providing articulated connecting means between at least a portion of said limb means and at least one of another portion of said limb means or said body means;
said dummy comprising:
motorcycle handle bar gripping means
included in said hand means, and
operable to releasably connect said dummy and motorcycle handle bar means,
said motorcycle handle bar gripping means being operable to release said dummy from said motorcycle handle bar means after gripping force, imposed by said motorcycle handle bar gripping means on said handle bar means is overcome by the inertial forces imposed on said dummy during accident simulation;
first sensor means operable to sense at least one of stress and/or strain imposed on said limb means,
said first sensor means being operable to generate first data signal means in response to said sensing by said first sensor means;
second sensor means operable to sense at least one of stress and/or strain imposed on said joint means,
said second sensor means being operable to generate second data signal means in response to said sensing by said second sensor means;
said limb means including frangible fracture simulating means operable to fracture in response to inertial stress or external forces imposed on said dummy during accident simulation, said frangible, fracture simulating means including
visual indicating means operable to provide a visual simulation of limb fracturing, and
means operable to permit relative movement between fractured limb means segments simulating relative freedom of movement of fractured limbs during simulated accidents; and
said limb means includes, in at least one portion of said arm means or leg means,
first laminate means including first reinforcing means extending longitudinally of said portion and providing a predetermined degree of reinforcement in the longitudinal direction of said portion, and
second laminate means including second reinforcing means extending generally helically of said longitudinal direction and providing reinforcement in a direction generally helically related to said longitudinal direction; and
said longitudinally extending and helically extending first and second reinforcing means provides separately oriented reinforcing patterns intended to simulate multi-directional, diverse strength characteristics.

20. A method of simulating a motorcycle accident with a test dummy, where said dummy includes
head means;
neck means;
body means including
thorax means;
limb means including at least one of
arm means, and
leg means;
hand means; and
joint means providing articulated connecting means between at least a portion of said limb means and at least one of another portion of said limb means or said body means;
said method comprising:
providing in said test dummy motorcycle handle bar gripping means
included in said hand means, and
operable to releasably connect said dummy and motorcycle handle bar means;
said motorcycle handle bar gripping means being disposed so as to be operable to release said dummy from said motorcycle handle bar means after gripping force, imposed by said motorcycle handle bar gripping means on said handle bar means is overcome by the inertial forces imposed on said dummy during accident simulation;
providing first sensor means in said dummy operable to sense at least one of stress and/or strain imposed on said limb means,
said first sensor means being operable to generate first data signal means in response to said sensing by said first sensor means;
providing second sensor means in said dummy operable to sense at least one of stress and/or strain imposed on said joint means,
said second sensor means being operable to generate second data signal means in response to said sensing by said second sensor means;
providing in said limb means of said dummy frangible fracture simulating means operable to fracture in response to inertial stress or external forces imposed on said dummy during accident simulation, said frangible, fracture simulating means including
visual indicating means operable to provide a visual simulation of limb fracturing, and
means operable to permit relative movement between fractured limb means segments simulating relative freedom of movement of fractured limbs during simulated accidents; and
providing in at least one portion of said arm means or leg means,
first laminate means including first reinforcing means extending longitudinally of said portion and providing a predetermined degree of reinforcement in the longitudinal direction of said portion, and
second laminate means including second reinforcing means extending generally helically of said longitudinal direction and providing reinforcement in a direction generally helically related to said longitudinal direction;
said longitudinally extending and helically extending first and second reinforcing means providing separately oriented reinforcing patterns intended to simulate multi-directional, diverse strength characteristics.

* * * * *